(12) United States Patent
Aberman et al.

(10) Patent No.: US 11,854,120 B2
(45) Date of Patent: Dec. 26, 2023

(54) TECHNIQUES FOR REDUCING DISTRACTIONS IN AN IMAGE

(71) Applicant: Google LLC, Mountain View, CA (US)

(72) Inventors: Kfir Aberman, San Mateo, CA (US); Yael Pritch Knaan, Mountain View, CA (US); David Edward Jacobs, Mountain View, CA (US); Orly Liba, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/487,741

(22) Filed: Sep. 28, 2021

(65) Prior Publication Data

US 2023/0094723 A1 Mar. 30, 2023

(51) Int. Cl.
*G06T 11/00* (2006.01)
*G06N 20/00* (2019.01)
*G06T 5/00* (2006.01)
*G06T 11/60* (2006.01)

(52) U.S. Cl.
CPC ............ *G06T 11/001* (2013.01); *G06N 20/00* (2019.01); *G06T 5/005* (2013.01); *G06T 11/60* (2013.01)

(58) Field of Classification Search
CPC ................................ G06T 11/001; G06T 11/60
See application file for complete search history.

(56) References Cited

U.S. PATENT DOCUMENTS

| 8,248,494 B2 | 8/2012 | Du et al. |
| 11,544,853 B2 | 1/2023 | Sekine |
| 2012/0212640 A1 | 8/2012 | Kojima |
| 2015/0378999 A1* | 12/2015 | Dorner ................ G06F 16/5838 |
| | | 707/745 |
| 2017/0083762 A1* | 3/2017 | Segalovitz ............ G06V 10/25 |
| 2018/0005409 A1 | 1/2018 | Aksoy et al. |

(Continued)

FOREIGN PATENT DOCUMENTS

JP H 1173512 3/1999

OTHER PUBLICATIONS

Aberman et al., "Deep Saliency Prior for Reducing Visual Distraction", arXiv:2109.01980v1, dated Sep. 5, 2021, 12 pages.

(Continued)

*Primary Examiner* — Samantha (Yuehan) Wang
(74) *Attorney, Agent, or Firm* — Dority & Manning, P.A.

(57) ABSTRACT

Techniques for reducing a distractor object in a first image are presented herein. A system can access a mask and the first image. A distractor object in the first image can be inside a region of interest and can have a pixel with an original attribute. Additionally, the system can process, using a machine-learned inpainting model, the first image and the mask to generate an inpainted image. The pixel of the distractor object in the inpainted image can have an inpainted attribute in chromaticity channels. Moreover, the system can determine a palette transform based on a comparison of the first image and the inpainted image. The transform attribute can be different from the inpainted attribute. Furthermore, the system can process the first image to generate a recolorized image. The pixel in the recolorized image can have a recolorized attribute based on the transform attribute of the palette transform.

20 Claims, 13 Drawing Sheets

(7 of 13 Drawing Sheet(s) Filed in Color)

(56) References Cited

U.S. PATENT DOCUMENTS

2020/0302656 A1    9/2020  Kumar et al.
2021/0150678 A1*   5/2021  Yi ........................ G06N 3/0454
2022/0129682 A1*   4/2022  Tang ...................... G06V 20/53
2022/0321852 A1*  10/2022  Zhu .......................... G06T 5/20

OTHER PUBLICATIONS

Gao et al., "Personal Photo Enhancement via Saliency Driven Color Transfer", Proceedings of the International Conference on Internet Multimedia Computing and Service, 2016, pp. 273-276.

Mechrez et al., "Saliency driven image manipulation", Machine Vision and Applications, vol. 30, No. 2, 2019, pp. 189-202.

* cited by examiner

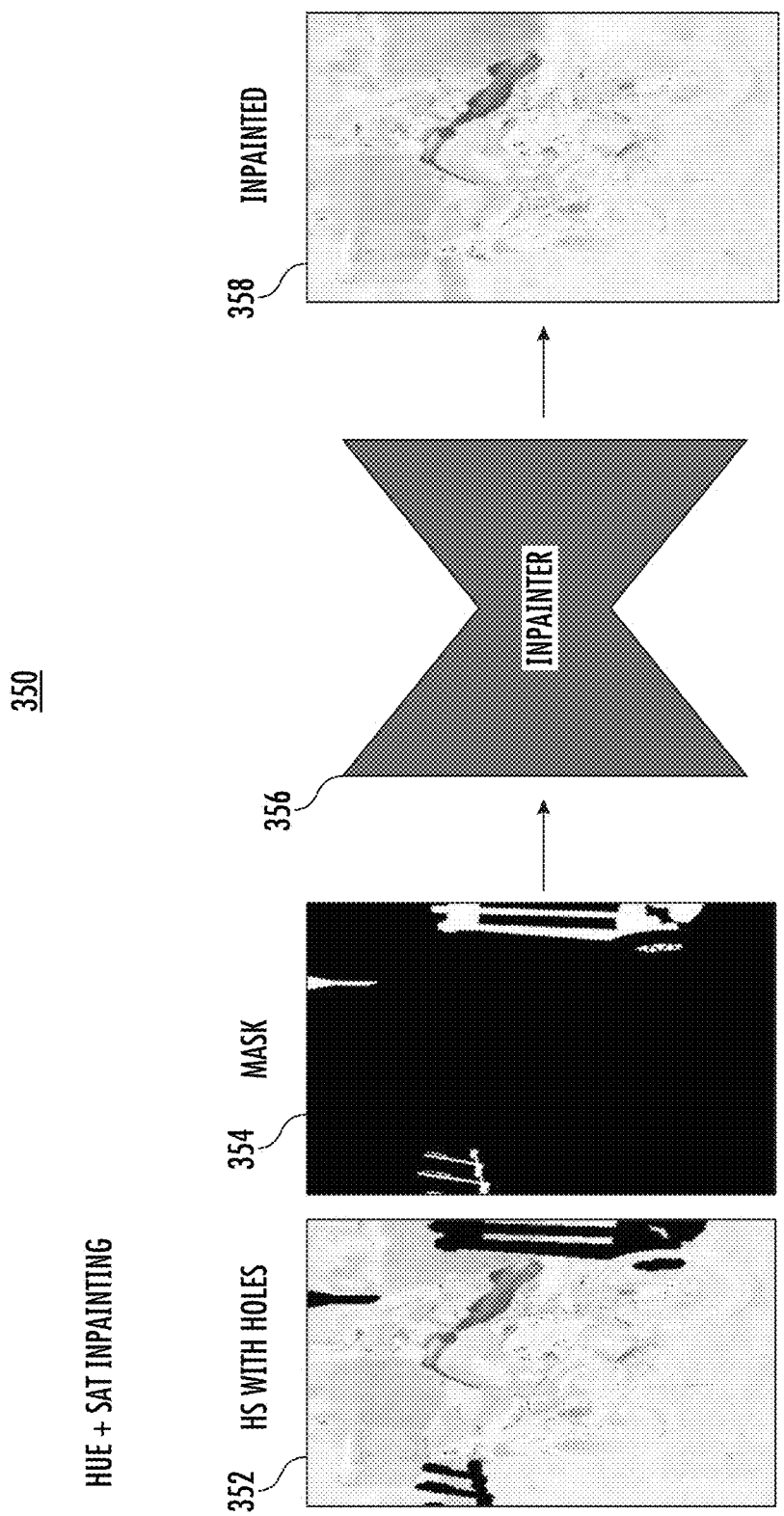

TECHNIQUES FOR REDUCING DISTRACTIONS IN AN IMAGE

FIELD

The present disclosure relates generally to reducing distractions in an image. More particularly, the present disclosure relates to techniques for harmonizing a distractor within an image while maintaining realism of the image.

BACKGROUND

An image (e.g., photograph, frame of a video) and other forms of image data often include a distraction that can capture the eye-gaze of a user. As one example, the distraction can correspond to a distracting object (e.g., clutter in the background of a room, a bright color of one section of a background object) that distracts from the main subject (e.g., main speaker participating in a video call). As another example, the unwanted distractor object can correspond to an unsightly object in an otherwise pristine portrait photograph of a user. Thus, distractor objects can correspond to objects which grab a user's visual attention away from the main subject of the image.

In conventional systems, the distractor object can be removed from the image. However, replacing the distractor object can be a challenging problem. In some instances, it may not be possible to remove the distractor from the image without distorting the image or making the image look unrealistic. For example, if the distractor object is one section of a background object (e.g., a chair) that is distracting (e.g., distracting color, bright color, distracting pattern), the distractor object may not be easily removed without distorting the background object.

SUMMARY

Aspects and advantages of embodiments of the present disclosure will be set forth in part in the following description, or can be learned from the description, or can be learned through practice of the embodiments.

The present disclosure provides systems and methods for reducing saliency (e.g., attention) of distractors in an image by using a machine-trained model to manipulate the colors of the distractors, while maintaining the structure and content of the distractors. For example, chromatic information of the distractor(s) can be manipulated (e.g., so as to reduce saliency) while luminance information can be maintained (e.g., so as to maintain visual structure). Distractors can be defined as the regions of an image that draw attention away from the main subjects and reduce the overall user experience. In some instances, the resulting effects can be achieved solely using a pretrained model with no additional user input.

One example aspect of the present disclosure is directed to a computer-implemented method for reducing a distractor object in a first image. The method can include accessing, by one or more computing devices, a mask and the first image having the distractor object. The mask can indicate a region of interest associated with the first image. The distractor object can be inside the region of interest and have one or more pixels with an original attribute. The method can further include processing, using a machine-learned inpainting model, the first image and the mask to generate an inpainted image. The one or more pixels of the distractor object can have an inpainted attribute in one or more chromaticity channels. Additionally, the method can include determining a palette transform based a comparison of the first image and the inpainted image. The one or more pixels of the distractor object can have a transform attribute in the one or more chromaticity channels, where the transform attribute is different than the inpainted attribute. Furthermore, the method can include processing the first image to generate a recolorized image. The one or more pixels of the distractor object in the recolorized image can have a recolorized attribute based on the transform attribute and the determined palette transform.

Another example aspect of the present disclosure is directed to a computing system, comprising one or more processors and one or more non-transitory computer-readable media. The one or more non-transitory computer-readable media can collectively store a machine-learned inpainting model and instructions that, when executed by the one or more processors, cause the computing system to perform operations. The machine-learned inpainting model can be configured to generate an inpainted image using a first image. The operations can include accessing a mask and the first image having the distractor object. The mask can indicate a region of interest associated with the first image. The distractor object can be inside the region of interest and have one or more pixels with an original attribute. Additionally, the operations can include processing, using the machine-learned inpainting model, the first image and the mask to generate an inpainted image. The one or more pixels of the distractor object can have an inpainted attribute in one or more chromaticity channels. Moreover, the operations can include determining a palette transform based a comparison of the first image and the inpainted image. The one or more pixels of the distractor object can have a transform attribute in the one or more chromaticity channels. The transform attribute can be different than the inpainted attribute. Furthermore, the operations can include processing the first image to generate a recolorized image. The one or more pixels of the distractor object in the recolorized image can have a recolorized attribute based on the transform attribute and the determined palette transform.

Yet another example aspect of the present disclosure is directed to one or more non-transitory computer-readable media that collectively store a machine-learned inpainting model. The machine-learned inpainting model can be learned by performance of operations. The operations can include accessing a mask and the first image having the distractor object. The mask can indicate a region of interest associated with the first image, and the distractor object can be inside the region of interest with one or more pixels having an original attribute. Additionally, the operations can include processing, using the machine-learned inpainting model, the first image and the mask to generate an inpainted image. The one or more pixels of the distractor object can have an inpainted attribute in one or more chromaticity channels. Moreover, the operations can include determining a palette transform based a comparison of the first image and the inpainted image. The one or more pixels of the distractor object can have a transform attribute in the one or more chromaticity channels, and the transform attribute can be different than the inpainted attribute. Furthermore, the operations can include processing the first image to generate a recolorized image. The one or more pixels of the distractor object in the recolorized image can have a recolorized attribute based on the transform attribute and the determined palette transform.

In some instances, the processing the first image to generate the inpainted image described in the method can include processing the first image and the mask to generate a masked image. The masked image can be inputted into the machine-learned inpainting model to generate the inpainted image. Additionally, the recolorized attribute determined in the method described herein can be different than the inpainted attribute.

In some instances, the one or more chromaticity channels can include hue and saturation (HS) channels. Additionally, a value attribute for each pixel in the original image, the inpainted image, and the recolorized image can be kept constant.

In some instances, the recolorized attribute can be different from the inpainted attribute.

In some instances, the palette transform can be generated through performance of a voting technique. For example, the palette transform can be a machine-learned model having a voting classifier. The machine-learned model can be based on majority voting, plurality voting, weighted voting, simple averaging, weighted averaging, and so on.

In some instances, the distractor object can include a plurality of pixels with the original attribute. The one or more pixels of the distractor object can be determined to have the transform attribute based on a plurality voting technique. In other instance, the determination of the transform attribute can be based on majority voting, weighted voting, simple averaging, weighted averaging, or other voting techniques.

In some instances, the palette transform can be further determined based on a dilated mask. The dilated mask can have an expanded region of interest associated with the first image. The expanded region of interest of the dilated mask being larger than the region of interest of the mask.

In some instances, the machine-learned inpainting model is trained using in one or more chromaticity channels training data. For example, the machine-learned inpainting model can be trained using hue and saturation (HS) training data.

In some instances, the method can further include accessing a raw image. The raw image can be in a red-green-blue (RGB) color space. The method can further include processing the raw image to generate the first image. For example, the first image can be in a hue-saturation (HS) channels, and a value attribute for each pixel in the first image can be kept constant when the raw image is processed to generate the first image. Additionally, the raw image can be a high-resolution image (e.g., greater than 300 dots per inch (DPI)), and a version of the first image that is processed by the machine-learned inpainting model is a low-resolution image (e.g., less than 300 DPI). This is an example of an improved technical effect because of faster processing time for the inpainting model, because the inpainting model can process the low-resolution image.

In some instances, the recolorized image can also be in the HS channels. Moreover, the method can further include processing the recolorized image to generate a final image. The final image can be in a red-green-blue (RGB) color space. Furthermore, the recolorized image can be a high-resolution image, and the inpainted image is low-resolution image. This is another example of an improved technical effect by allowing faster processing time (e.g., by processing a low-resolution image) without reducing the image quality Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Detailed discussion of embodiments directed to one of ordinary skill in the art is set forth in the specification, which makes reference to the appended figures, in which:

FIG. 3C depicts an illustration of inpainting technique in the hue-saturation channels according to example embodiments of the present disclosure.

Figure 1A:
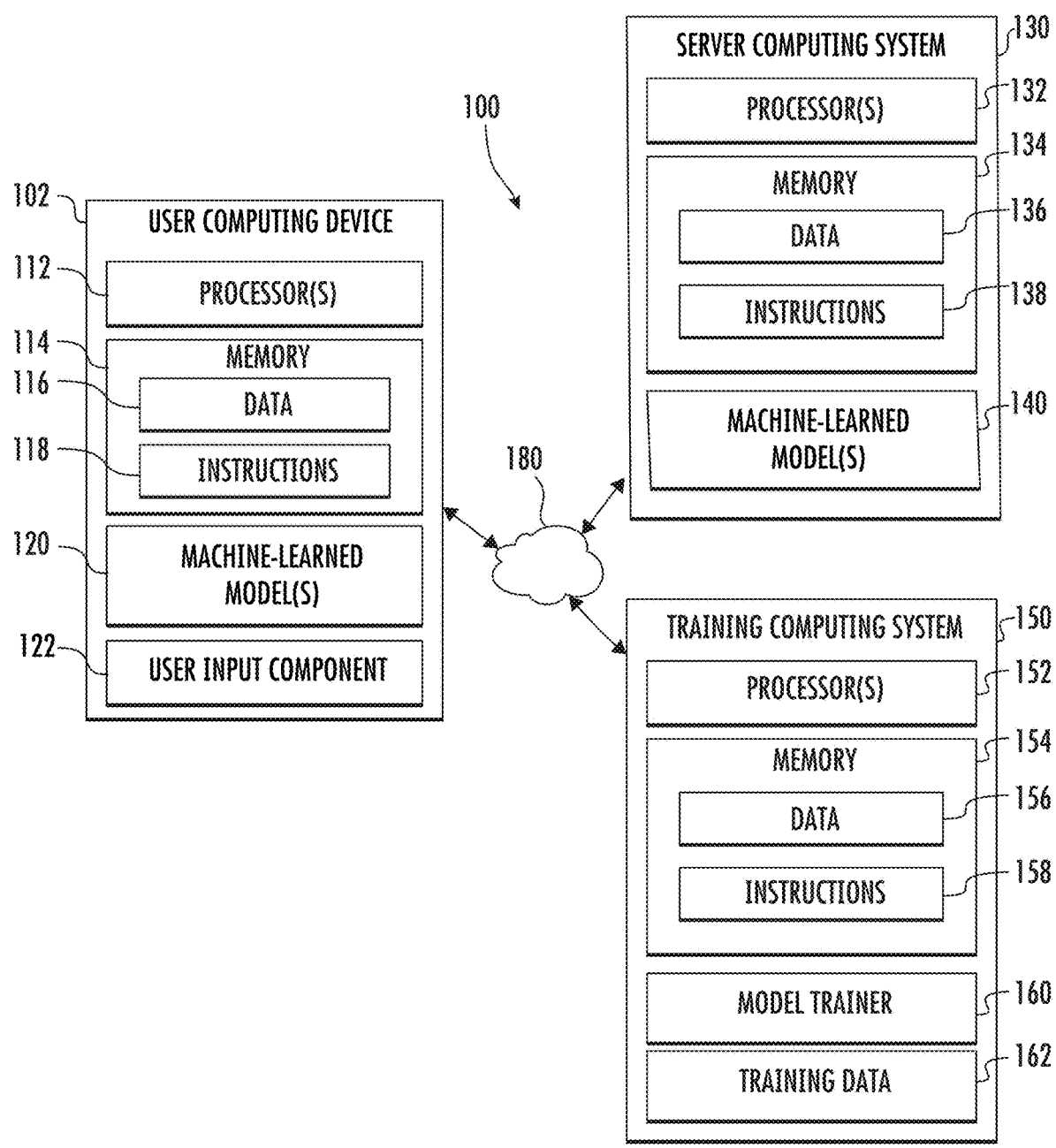
FIG. 1A depicts a block diagram of an example computing system according to example embodiments of the present disclosure.

Reference numerals that are repeated across plural figures are intended to identify the same features in various implementations.

DETAILED DESCRIPTION

Generally, the present disclosure is directed to systems and methods that use the outputs of one or more machine learning models (e.g., one or more inpainting models) to generate a palette transform that can be used to modify an image to reduce distractions. In some implementations, as described herein, the image can be modified to harmonize (e.g., camouflage) a distractor object with the background of the image while maintaining realism of the image. For example, different sections of the distractor object in the image can be recolorized to harmonize with the background of the image. In particular, the palette transform can be used to modify the chromatic information of the distractor(s) (e.g., so as to reduce saliency) while the luminance information associated with the distractor(s) can be maintained or left unmodified (e.g., so as to maintain visual structure).

In particular, in some example implementations, inpainting outputs provided by a machine-learned inpainting model can be leveraged to generate a palette transform that can be used to recolor an input image. Specifically, an input image can be obtained that includes a distractor object. A mask can indicate the location of the distractor object. The mask can be applied to the input image to obtain a masked image in which the distractor object has been masked out. The masked image can be processed using the machine-learned inpainting model to generate an inpainted image. The inpainted image can have inpainted attributes (e.g., color values) at the masked locations. A palette transform can be determined by comparing the input image with the inpainted image. For example, determining the palette transform can include performing a voting technique in which, for each pixel included in a voting region, the pixel's color in the input image is mapped to and votes for the color in the inpainted image at the corresponding pixel location. In some implementations, according to an aspect of the present disclosure, the palette transform is generated only for the chromaticity channels of a color space (e.g., hue and saturation channels in an HSV color space). The palette transform can then be applied to at least the portion of the input image that contains the distractor to recolorize the distractor. Because, in some implementations, the palette transform operates to change only chromaticity information, the distractor can be modified so that its saliency is reduced while its visual structure is maintained. Further, because the output image is generated by applying the palette transform to the input image (e.g., as opposed to providing the inpainted image as output), artefacts or other distortions introduced by a typical inpainting model can be avoided. Instead, the inpainting model is simply used to facilitate generation of the palette transform.

More particularly, conventional techniques (e.g., style transfer, color harmonization, image camouflage, saliency driven image manipulation) have been used to tackle related problems, but none of the conventional techniques can properly maintain the realism of the image. In particular, certain conventional techniques can be used to edit an image to remove a distractor object from the background of the image. However, removing the distractor object using conventional techniques may not be ideal in certain situations, such as when the structure of the object is needed to be maintained. In contrast, the techniques described in some embodiments of the present disclosure can reduce the attention associated with a distractor object, while maintaining realism in the image (e.g., while maintaining the visual structure of the distractor object).

In some instances, the realism of the image can be maintained when a distractor object in the background is not removed, but instead the distracting colors of the distractor object are recolorized (e.g., modified). The structure of an object (e.g., chair with multiple patterns) can be maintained, while the system changes the distracting colors or pattern in the object (e.g., a distractor color in a section of the chair, a distractor pattern within the multiple patterns of the chair) to a color or pattern that is more similar to the background. By changing the distracting component (e.g., color, pattern) to a color or pattern similar to the background, the distracting component can blend (e.g., camouflage) in with the background, which can result in the reduction of the attention associated with the distracting component. For example, strong or discordant background colors may be distracting, and the system can harmonize the strong background colors with the more commonly appearing background colors of the image to reduce distraction.

According to an aspect of the present disclosure, certain portions of the techniques described herein can be performed on fewer than all of the channels included in a color space. As an example, in some implementations, at least the palette transformation can be generated for and applied in only the chromaticity channels of a color space while the luminance channel(s) can be unaltered. Thus, in one example, a raw image can be provided in a first color space (e.g., RGB) and can be converted to a second color space (e.g., HSV) that contains both chromaticity and luminance channels. The remainder of the process (e.g., including masking, inpainting, palette transform generation, and palette transform application) can then be performed with respect to only the chromaticity channels (e.g., the HS channels, but not the V channel in an HSV color space). The recolorized image can then be optionally transformed back into the first color space (e.g., RGB), if desired.

In other implementations, fewer portions of the process can be performed only with respect to the chromaticity channels. As one example, in some implementations, an input RGB image can be masked and inpainting can be performed in the RGB space. Next, the input RGB image and the inpainted RGB image can be converted to the alternative color space (e.g., HSV) and the palette transform can be generated for the chromaticity channels (but not the luminance channel(s)). The palette transform can be applied to the converted (e.g., HSV) input image to generate the recolorized image in the second color space (e.g., HSV). Again, the recolorized image can optionally be transformed back to RGB if desired. This alternative approach can enable the process to leverage an inpainting model that operates in RGB space, as such an inpainting model may be more commonly available.

According to another aspect of the present disclosure, certain portions of the techniques described herein can be performed on imagery having a relatively lower resolution while other portions can be performed on imagery having a relatively higher resolution. For example, the processing of the masked image with the inpainting model can be performed on lower resolution imagery. The palette transform can be generated from such lower resolution processing. Because only color transformation information is extracted from the inpainting process, the resolution of the inpainting output is of less importance. Then, the palette transform can be applied to the input image in the higher resolution. In such fashion, computational savings can be achieved by performing certain actions in lower resolution while maintaining the ability to achieve higher resolution recolorized outputs.

The systems and methods of the present disclosure provide several technical effects and benefits. Aspects of the present disclosure can provide several technical improvements to machine-learning training for image processing and editing, image processing technology, and image editing technology. As an example, to help improve the realism of an image when a distraction is reduced, the image editing technology of the present disclosure can maintain the structure of distracting objects while reducing the distraction within the image. Additionally, the image editing technology is improved at least in part based on machine-learned inpainting model and the palette transform. The palette transform can be generated by applying a voting technique to the outputs of the machine-learned inpainting model. In some implementations, the machine-learned inpainting model can be trained and run using low-resolution image data. In some instances, the image data can include data in one or more chromaticity channels. By training and/or running the models on or using low-resolution images, the computational resources (e.g., processor time, memory usage, etc.) to train and/or run the models can be reduced.

Systems and methods described herein can improve the processing speed of the image processing and also reduce the computing resources needed to perform the image processing. The techniques described in the present disclosure describe processes for transforming high-resolution images to low-resolution images in order to process the low-resolution images without losing the image quality of the final images that have been modified. By allowing for the image processing (e.g., the inpainting portion of the process) to be done on low-resolution images, the processing time is reduced, and the computing resources required for the processing is reduced. As a result, the system can achieve state-of-the-art performance while maintaining a high level of image quality. Thus, the performed image editing can be higher quality (e.g., more accurate) than previous techniques, which represents an improvement in the performance of a computing system.

The use of low-resolution images, that has been transformed from high-resolution images, also removes some confusion from the tuning and makes the tuning more efficient, thereby conserving computing resources. The trained system may reduce the amount of computing resources utilized versus previous systems. In particular, certain less efficient approaches to image editing may attempt to learn to mimic human edits in a supervised fashion. Instead, the present disclosure leverages access to a pre-trained model to drive generation of a palette transform that is then applied to effectuate the image editing process.

Additionally, the proposed approaches may eliminate the need to create or perform multiple different edits on an image to achieve a desired effect. For example, certain existing techniques may require trial and error using a number of different stock editing operations until a desired result is achieved. The systems and methods can instead directly use a machine-learned model that achieves the desired effect. By reducing the number of editing operations that need to be performed, the systems and methods of the present disclosure can result in savings of computing resources such as processor usage, memory usage, and/or network bandwidth usage.

Moreover, using the techniques described herein, the system can demonstrate better performance over existing methods using internal real-world image data. The proposed approaches can reduce distractions in an image, while maintaining the realism of the image, in less processing time and with less computing resources than existing methods. This, in turn, improves the functioning of cameras, image recording devices, video recording devices, image processing devices, and other image-related devices.

Furthermore, systems and methods of the present disclosure may utilize machine learning technology to improve the editing of an image to remove a distraction from the image. Specifically, example systems and methods of the present disclosure can leverage using a model processing low-resolution images to train the system to successfully reduce a distraction within a region of interest.

As the implementation of machine learning also eliminates the need to manually edit every occurrence of a distraction in an image, more efficiency may be added. The system may also eliminate the need for a coder to write a complicated code, run the code, refine the code, and continually supervise performance.

In some implementations, the models can be trained or have been pre-trained based on eye-gaze data. The eye-gaze data can include the location of an image that is being viewed by a user, which can be used to determine human visual attention. For example, the mask can be automatically generated by the system using eye-gaze data.

Additionally, techniques described herein allows for editing images to decrease human attention for the purpose of reducing visual distraction, but also increasing human attention to a main subject. For example, the system leverages machine-learned models to drive drastic, but still realistic, edits, which can significantly change an observer's attention to different regions in the image. This capability can have important applications, such as photography, where pictures often contain objects that distract from the main subject(s) we want to portray, or in video conferencing, where clutter in the background of a room or an office may distract from the main speaker participating in the call.

Techniques described herein demonstrate how image editing processes can be guided by the knowledge of visual attention embedded within the machine-learned models. User studies of the implemented image editing model show that the produced image edits: a) effectively reduce the visual attention drawn to the specified regions, b) maintain well the overall realism of the images, and c) are significantly more preferred by users over other existing editing effects.

With reference now to the Figures, example embodiments of the present disclosure will be discussed in further detail.

Example Devices and Systems

FIG. 1A depicts a block diagram of an example computing system 100 that performs image editing according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more models 120. For example, the models 120 (e.g., inpainting model) can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. In other examples, the models 120 can be specific image editing models which are differentiable, and which have been parameterized to facilitate application of machine learning techniques. Example models 120 are discussed with reference to FIGS. 2-6.

In some implementations, the one or more models 120 can be received from the server computing system 130 over network 180, stored in the user computing device memory 114, and then used or otherwise implemented by the one or more processors 112. In some implementations, the user computing device 102 can implement multiple parallel instances of a single model 120.

More particularly, the models 120 can be trained using a training computing system 150 with a set of training data 162 to train the parameters of the model to optimize the model. The training computing system 162 may rely on eye-gaze data to add efficiency and precision to the training module. Training data may also include the creation of low-resolution processed image data from high-resolution raw image data. Masks may also be used in training to provide a region of interest or a marker for the size and location of the unwanted data. In some instances, the mask can be inputted using a user input component 122 or automatically determined based on eye gaze data. In some instances, if the user has provided consent, the eye gaze data can be real-time data received from the user computing device 102.

Additionally, or alternatively, one or more models 140 can be included in or otherwise stored and implemented by the server computing system 130 that communicates with the user computing device 102 according to a client-server relationship. For example, the models 140 can be implemented by the server computing system 140 as a portion of a web service (e.g., an image editing service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-6.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the image editing models 120 and/or 140 based on a set of training data 162. The training data 162 can include, for example, a set of raw image data, a set of processed image data, and a set of masks to indicate the region of interest, a set of inpainted image data, and a set of recolorized image data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory, and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
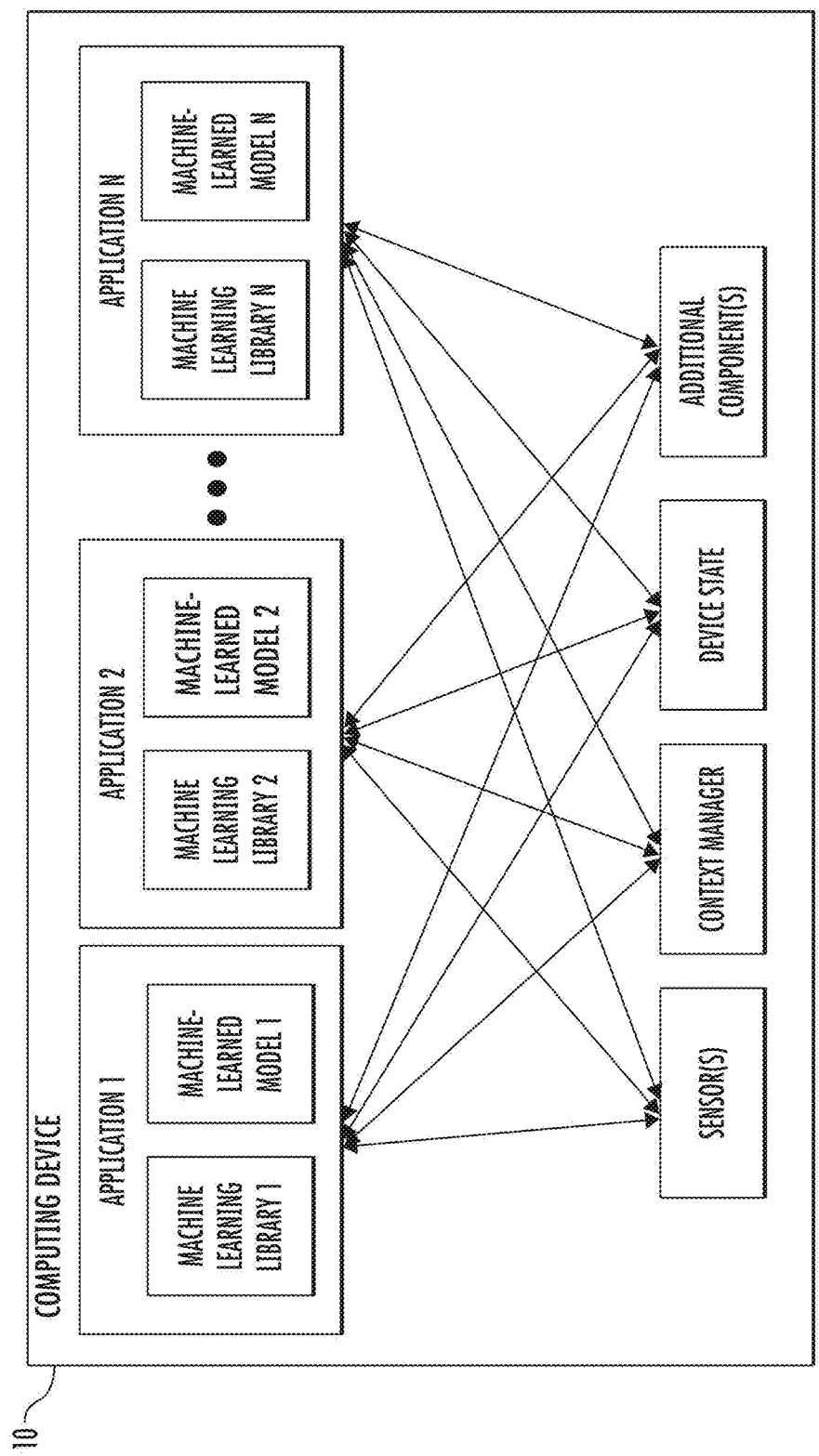
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
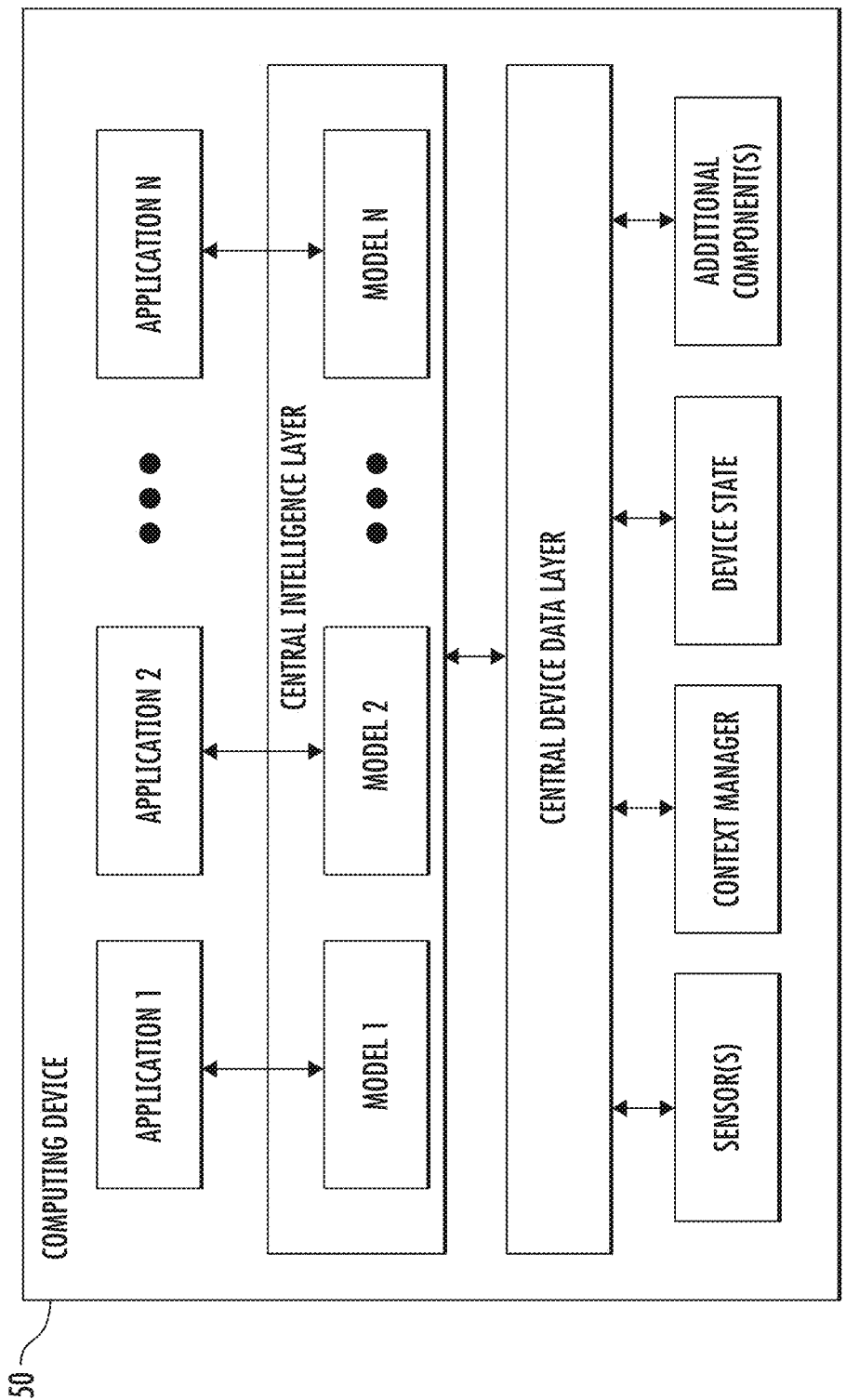
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
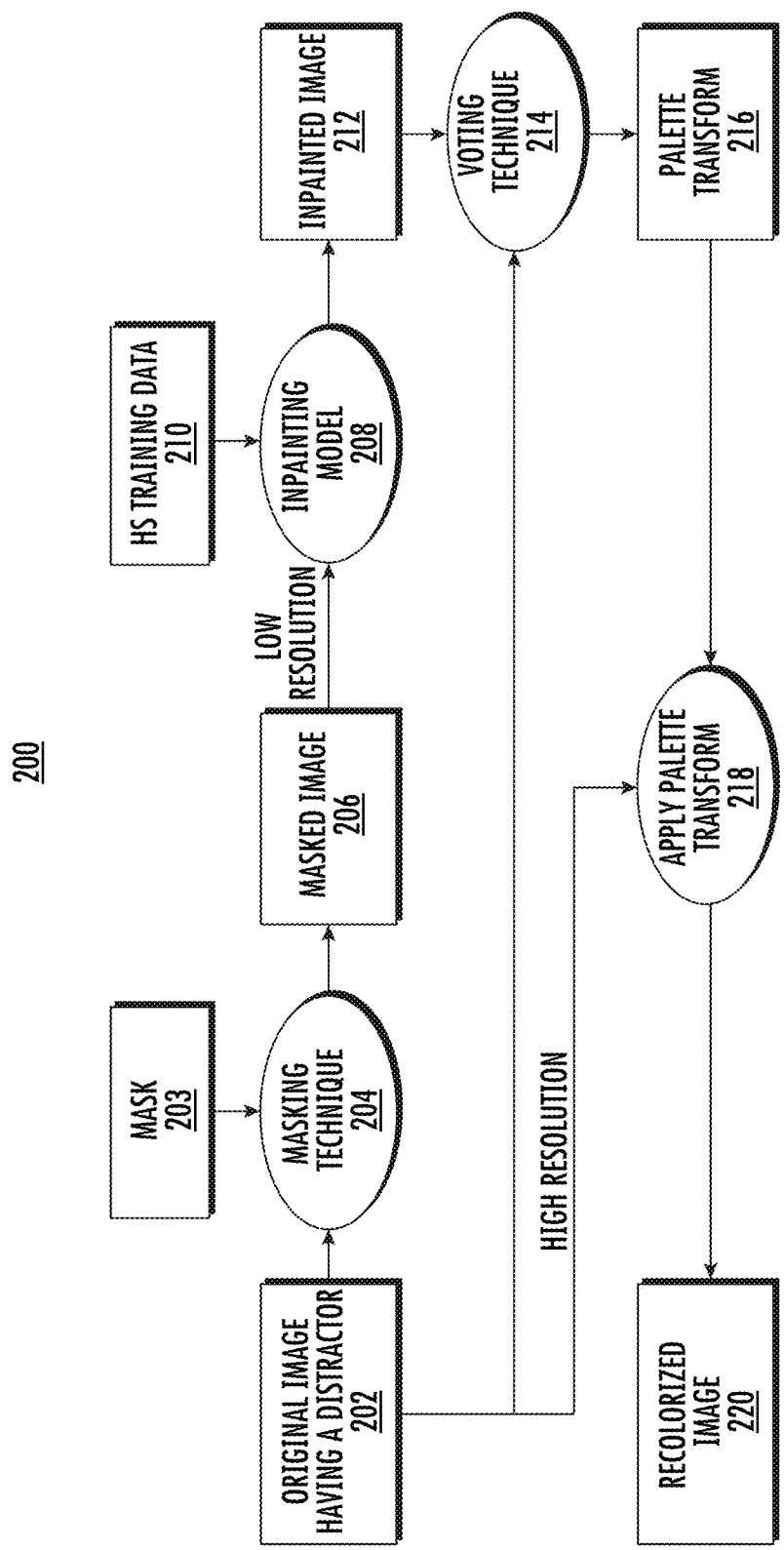
FIG. 2 depicts a flow diagram of an example technique for reducing a distractor object in an image according to example embodiments of the present disclosure.

FIG. 2 depicts a flow diagram of an example technique 200 for reducing a distractor object in an image, according to example embodiments of the present disclosure. In some implementations, the computing system (user computing device 102, server computing device 130, training computing device 150, computing device 10, computing device 50) can process an original image to reduce the distractor from the image using the example technique 200 described in FIG. 2.

The computing system can access (e.g., obtain, receive) an original image having a distractor 202 and a mask 203. In some instances, the mask 203 can be determined by a machine-learned model 140 of the server computing system 130 (e.g., by using a segmentation model that determines the boundary of the distractor object) or the mask can be obtained by the user input component 122 of the user computing device 102. For example, a user can input, using the user input component 122, the mask 203 having a region of interest associated with the distractor object, and for the distractor object within the region of interest to be reduced from the image. A masked image 206 can be generated by the computing system using a masking technique 204, by processing the mask 203 and the image having the distractor 202.

Figure 3A:
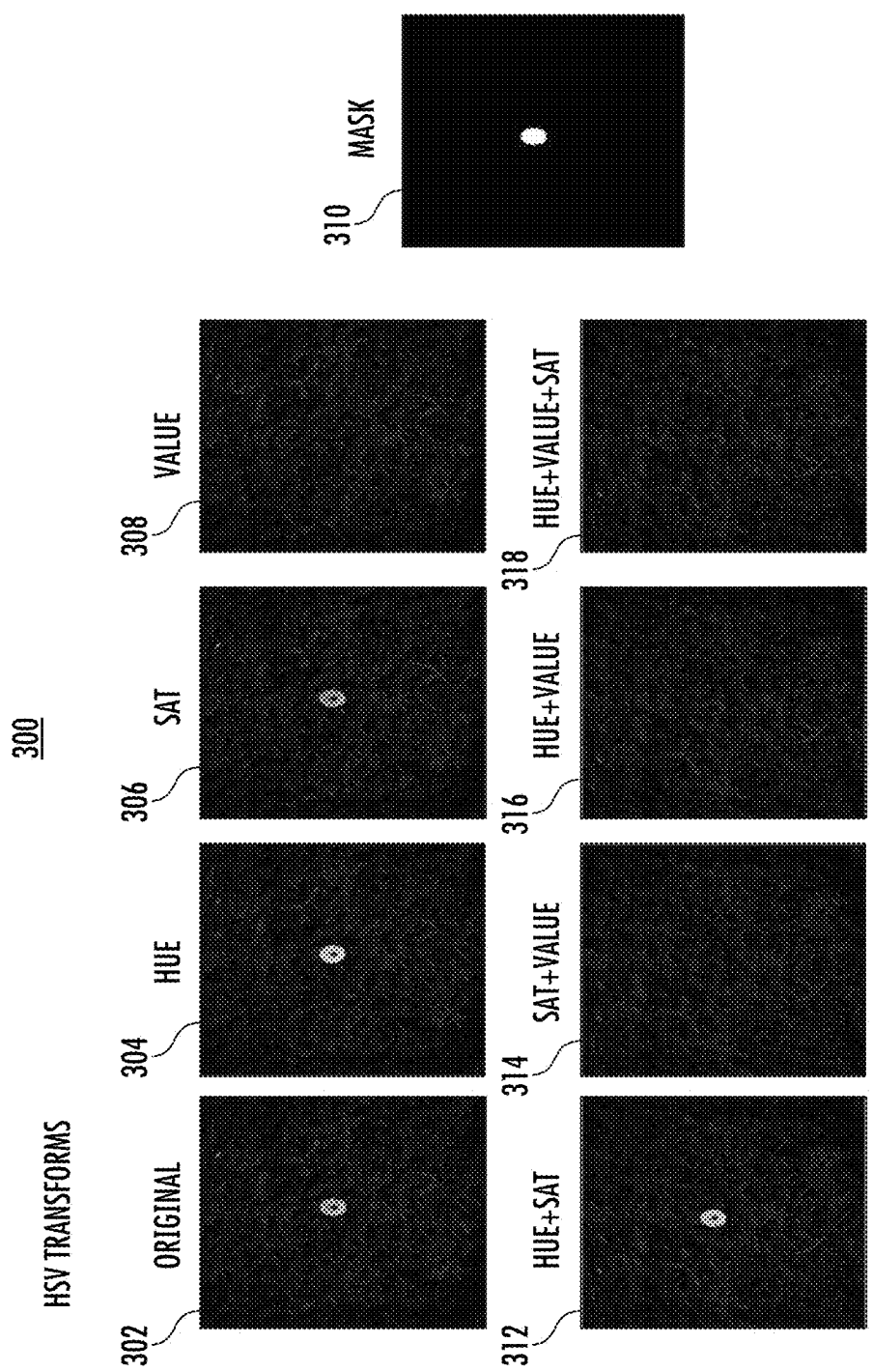
FIG. 3A depicts an illustration of a hue-saturation-value (HSV) transform technique according to example embodiments of the present disclosure.
Figure 3B:
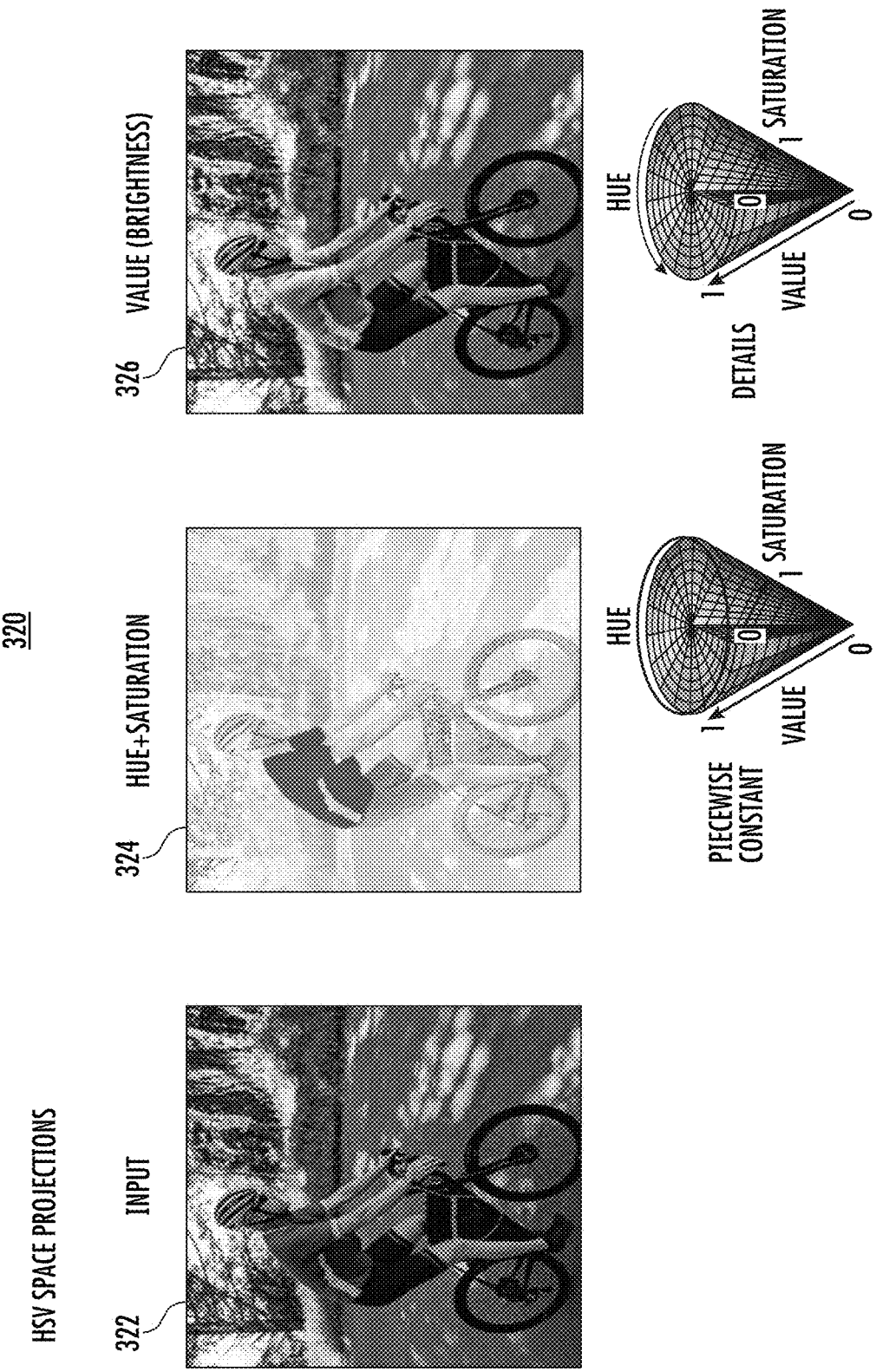
FIG. 3B depicts an illustration of a HSV space projections technique according to example embodiments of the present disclosure.

Additionally, the masked image 206 can be inputted into an inpainting model 208 to generate an inpainted image 212. In some implementations, the masked image 206 can be a lower resolution than the original image having the distractor 202, which can result in faster processing time by the inpainting model 208. The inpainting model 208 can have been previously trained using training data 210. In some instances, the inpainted image 212 can be generated in the hue-saturation (HS) channels of the hue-saturation-value (HSV) color space. When the inpainted image 212 is generated in the HS channels, the inpainting model 208 can be trained using HS training data 210. By only using two chromaticity channels (e.g., HS), and keeping the luminance channel (e.g., value) constant, the processing to generate the inpainted image is faster, and the training of the inpainted model is more efficient. Additionally, by keeping the value channel constant, the structure of the original image is unaltered, which results in a final image that maintains its realism. FIGS. 3A-3C further describe techniques for inpainting.

In some implementations, a raw image or the original image can be in the red-green-blue (RGB) color space. Similar to RGB, hue-saturation-value (HSV) is another example of a color space. In some instances, the raw image, which can be in the RGB color space, can be processed into the original image, which can be in the HSV color space. The hue, saturation, and value are channels in the HSV color space. The hue and the saturation are chromaticity channels in the HSV spaces. Each pixel in an image can have an attribute (e.g., numerical value) for each channel in the color space of the image. HSV color space can also be known as a hue-saturation-lightness (HSL) color space and a hue-saturation-brightness (HSB) color space. In these alternate color spaces, instead of keeping the value channel constant, the lightness channel in the HSL color space or the brightness channel in the HSB color space can be kept constant. Additionally, by using a hue-saturation (HS) rectangular grid, the techniques described herein can mitigate quantization via smoothing the color transfer. For example, by working on a rectangular grid in HS space, each HS cell can have well-defined adjacent cells in both directions. This is an example of a technical benefit for mitigating quantization by smoothing the color transfer.

Figure 4:
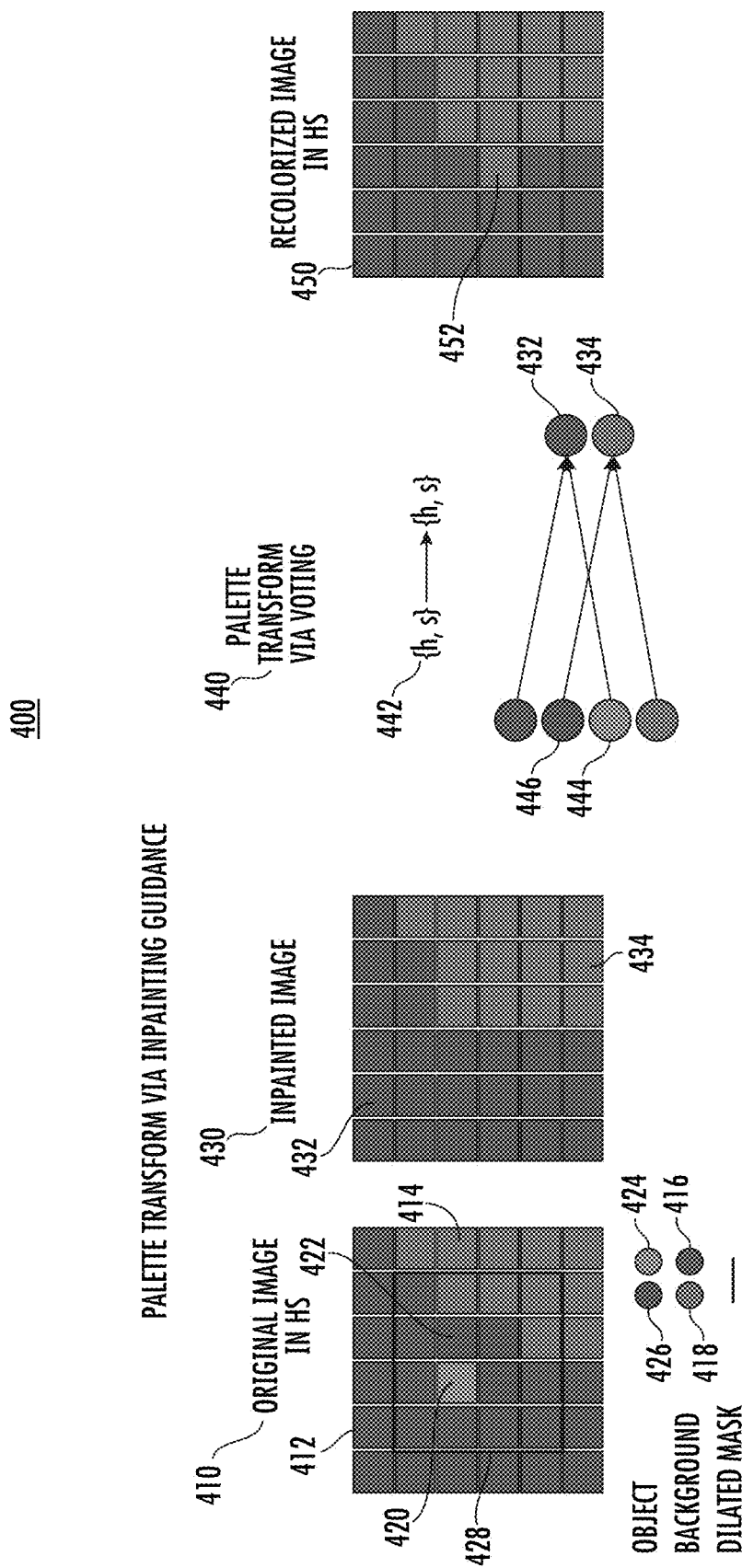
FIG. 4 depicts a diagram of determining a palette transform using a voting technique according to example embodiments of the present disclosure.

Subsequently, technique 200 can continue with the computing system determining a palette transform 216 using a voting technique 214. In some implementations, the voting technique 214 can be performed on (e.g., limited to) an area of the inpainted image 212 that is inside a dilated mask. The dilated mask can have an enlarged region of interest than the region of interest for the mask 203. For example, the dilated mask can be generated by dilating the mask 203 to include within the masked region additional pixels surrounding a perimeter of the original masked region. One of the benefits of the techniques described herein is that the mask 203 does not have to be highly accurate for the process to still function correctly. The techniques described herein can reduce the distractor from the image even when the mask is inaccurate. FIG. 4 further describes techniques for determining a palette transform using a voting technique. Likewise, using the dilated mask for the voting technique 214 can enable surrounding information to be included in the voting technique 214 which can enable improved palette transform results.

Once the palette transform 216 is determined, a recolorized image 220 can be generated using the original image 202 by applying the palette transform 218. The original image 202 can be a high-resolution image and the recolorized image 220 can also be a high-resolution image. By doing the voting technique 214 on the inpainted image, which can be a low-resolution image, the techniques allow for more efficient processing while maintaining the quality/resolution of the original image for the recolorized output. FIG. 4 further describes techniques for determining a palette transform using a voting technique.

FIG. 3A depicts an illustration 300 of a HSV transform technique, according to example embodiments of the present disclosure. In some implementations, the computing system (user computing device 102, server computing device 130, training computing device 150, computing device 10, computing device 50) can process an original image to generate a processed image using the HSV transform techniques described in FIG. 3A. In some instances, the computing system can transform the specified attribute(s) in the HSV space of one or more pixels in the original image within the masked area to be similar (e.g., equal) to the attribute(s) of the pixels outside the mask.

The techniques include transforming the original image 302 using a mask 310 by: only changing the hue channel in the hue image 304; only changing the saturation channel in the saturation image 306; only changing the value channel in the value image 308; changing the hue and saturation channels in the hue-sat image 312; changing the saturation and value channels in the sat-value image 314; changing the hue and value channels in the hue-value image 316; and changing the HSV channels in the HSV image 318.

In some embodiments, the computing system (user computing device 102, server computing device 130) can adapt colors of the background of the image to reduce the distraction. In conventional systems, RGB can be a common method for representing colors and objects in an image. However, as described in techniques in the present disclosure, HSV can also be a method for representing the colors and objects in an image. In some instances, HSV can be a better method for reducing the distractor while maintaining the realism of the image. As illustrated in the hue image 302, when only the hue of the flower is changed (e.g., average of the hue), the flower is still bright, but a green color. When the saturation is changed in the saturation image 306, the purple gets darker. When the value attribute is changed in the value image 308, the flower becomes grey and almost camouflages with the image. When all three components (HSV) are changed in the HSV image 318, the camouflaging of the flower is better than the camouflaging of any of the other images.

FIG. 3B depicts an illustration 320 of a HSV space projections technique, according to example embodiments of the present disclosure. In some implementations, the computing system (user computing device 102, server computing device 130, training computing device 150, computing device 10, computing device 50) can process an original image to generate a processed image using the HSV space projection techniques described in FIG. 3B.

According to some embodiments, the system modifies the input image 322 in the HSV space, instead of the RGB space. Some benefits of using the HSV can include retaining the structure of the image when the value attribute is constant. Retaining the structure of the image can improve the schematic perception of a user viewing the image. The schematic perception of an object can include distinctive features of an object that specifies the uniqueness of the object as perceived by a user.

As illustrated in FIG. 3B, a hue-saturation image 324 is generated from the input image 322, when the input image 322 is viewed only in the hue-saturation channels. For example, in the hue-saturation image 324, the value attribute for each pixel is removed or otherwise treated as separate data. Additionally, a value image 326 is generated from the input image 322, when the input image 322 is viewed only in the value (e.g., brightness) channel. For example, in the value image 324, the hue attribute and the saturation attribute for each pixel is removed or otherwise treated as separate data. As shown in the value image 326, the schematic perception (e.g., details) of the objects in the original image 322 are maintained when the value attribute is kept constant. Therefore, by keeping constant the value attribute (i.e., value attribute in the HSV space) for each pixel in the image, then the schematic perception of the objects in the image can be also maintained. Additionally, the schematic perception of the objects may not be reduced when the hue attribute and/or the saturation attribute for one or more pixels in the image are changed. Techniques described herein illustrate methods for reducing distractions in the image by modifying the hue attribute and/or the saturation attribute for one or more pixels of a distractor object in the image, while maintaining the value attribute of the pixels of the distractor object constant.

Alternatively, the system can transform the original image 322 to a processed image in the lightness-channel a-channel b (LAB) space, instead of the HSV space. When the original image is processed in the LAB space, then the lightness attribute for each pixel of the image can be kept constant in order to maintain the schematic perception of the objects in the image. Therefore, the channel-a attribute and/or channel-b attributes of one or more pixels of the image are modified, by the computing system, in order to reduce distractions in the original image.

FIG. 3C depicts an illustration 350 of inpainting technique in the hue-saturation channels, according to example embodiments of the present disclosure. In some implementations, the computing system (user computing device 102, server computing device 130, training computing device 150, computing device 10, computing device 50) can process an original image to generate a processed image using the inpainting technique described in FIG. 3C.

Figure 8:
FIG. 8 depicts another illustration of transforming an original image into a recolorized image according to example embodiments of the present disclosure.

The original image (e.g., original image 322) can be transformed into an HS image 352 (e.g., HS image with holes). This can be similar to the technique described in FIG. 3B when the original image 322 is transformed to a hue-saturation image 324. The HS image 352 and a mask 354 can be inputted into the inpainting model 356 to generate an inpainted image 358. The mask 354, which can be similar to the mask 203 in FIG. 2, can be received by the computing system or generated by the computing system. In this example, the distractor object, which was inside the mask 354, has been removed from the inpainted image 358, and the inpainting model 356 has determined a hue attribute and a saturation attribute for the pixels inside the mask 354 based on the hue attribute and a saturation attribute for the pixels in the HS image 352. FIG. 8 illustrates a recolorized image based on the inpainted image 358 of FIG. 3C, which illustrates how the distractor objects are blended in by bringing the background colors into the foreground of the image.

FIG. 4 depicts a diagram 400 of determining a palette transform using a voting technique, according to example embodiments of the present disclosure. In some implementations, the computing system (user computing device 102, server computing device 130, training computing device 150, computing device 10, computing device 50) can determine a palette transform using the voting technique described in FIG. 4.

According to some embodiments, the original image can be transformed into an original image in HS 410. FIGS. 3A-3C describes techniques for transforming a raw original image into an original image in the HS channel. The original image in HS 410 can include a first background region 412 having pixels (i.e., red pixels) with a first background HS attributes 416, and a second background region 414 having pixels (i.e., blue pixels) with a second background HS attributes 418. The original image in HS can also include a first section of the distractor object 420 having pixels (i.e., light green pixel) with a first distractor HS attributes 424, and a second section of the distractor object 422 having pixels (i.e., dark green pixels) with a second distractor HS attributes 426. The distractor object can be inside the dilated mask 428. The dilated mask can be similar to the dilated mask (e.g., mask 203 with an enlarged region of interest) discussed in FIG. 2.

One of the benefits of the techniques described herein is that the distractions can be reduced even when the mask is not accurate. In conventional systems, it may be complicated to have a precise mask, because the boundaries of the distractor object may be hard to determine. As a result, the techniques herein can assume that the mask is inaccurate, and still can properly reduce the distraction from the image.

Subsequently, a masked version of the original image in HS (not shown) is inputted into the inpainting model to generate an inpainted image 430. The inpainting model (e.g., inpainting model 208 in FIG. 2) can remove the distractor object inside the dilated mask. The inpainting model can transform the masked version of the original image in HS (not shown) into the inpainted image 430. In the inpainted image 430, the pixels of the distractor object (i.e., first section of the distractor object 420 (light green pixels), second section of the distractor object 422 (dark green pixels)) have been modified to be similar to either the pixels of the first background region 432 (i.e., red pixels) or the second background region 434 (i.e., blue pixels).

In some instances, the computing system can determine a palette transform 442 using a voting technique 440. In the example illustrated in diagram 400, each pixel can be recolorized by the color which most of the pixels with the same color voted to. The voting can be performed by counting the colors of the spatially corresponding pixels inside the dilated mask of the original image in HS 410 and the inpainted image 430. Additionally, as discussed in FIGS. 3A-C, by maintaining the value attribute constant, the schematic perception of the distractor object can be maintained, which results in the recolorized image being more realistic.

In this example, pixels of the first section of the distractor object with the first distractor HS attributes 444 (i.e., light green pixel) can vote to have a similar HS attributes to the HS attributes of the first background region 432 (e.g., red pixels). In this example, the light green pixel votes to be a red pixel because there is only one light green pixel in the original image in HS 410, and the light green pixel is transformed into a red pixel in the inpainted image 430. Therefore, there is one vote for the red pixel and zero votes for blue pixel, which results in the red pixel getting the highest number of votes. Based on this voting technique example (i.e., the red pixel getting the highest number of votes), a first voting classifier can be assigned. The voting classifier can be that the pixels in the first section of the distractor object 420 (e.g., any light green pixels) can be transformed to have an HS attributes that is similar to the first background HS attributes 416 (e.g., transformed to red).

Additionally, pixels of the second section of the distractor object with the second distractor HS attributes 446 (i.e., dark green pixels) can vote to have similar HS attributes to the HS attributes of the second background region 434 (e.g., blue pixels). In this example, one of the dark green pixels votes to be a red pixel, while two of the dark green pixels votes to be a blue pixel, based on the transformation of the dark green pixels in the inpainted image 430. Therefore, there is one vote for red pixel and two votes for blue pixel, which results in the blue pixel getting the highest number of votes. Based on this voting technique example (i.e., the blue pixel getting the highest number of votes), a second voting classifier can be assigned. The second voting classifier can be that the pixels in the second section of the distractor object 422 (e.g., any dark green pixels) can be transformed to have an HS attributes that is similar to the second background HS attributes 418 (e.g., transformed to blue). Although in the simplified example given in FIG. 4, all distractor pixels are transformed to a different color, in some instances, the first distractor HS attributes 424 can equal the first background HS attributes 416. Stated differently, it is possible that in some instances a palette transform may retain certain colors included in the original distractor.

Once the palette transform has been determined, the computing system can transform the original image in HS 410 to a recolorized image in HS 450 using the palette transform 440. In this example, based on the palette transform 440, the first distractor HS attributes 424 in the original image in HS 410 can be transformed to be similar (e.g., equal) to the first background HS attributes 416. Additionally, based on the palette transform 440, the second distractor HS attributes 426 in the original image in HS 410 can be transformed to be similar (e.g., equal) to the first background HS attributes 418. As a result of this transformation, pixel 452 has been modified into a blue pixel in the recolorized image in HS 450, whereas the corresponding pixel was red in the inpainted image 430.

Example Methods

Figure 5:
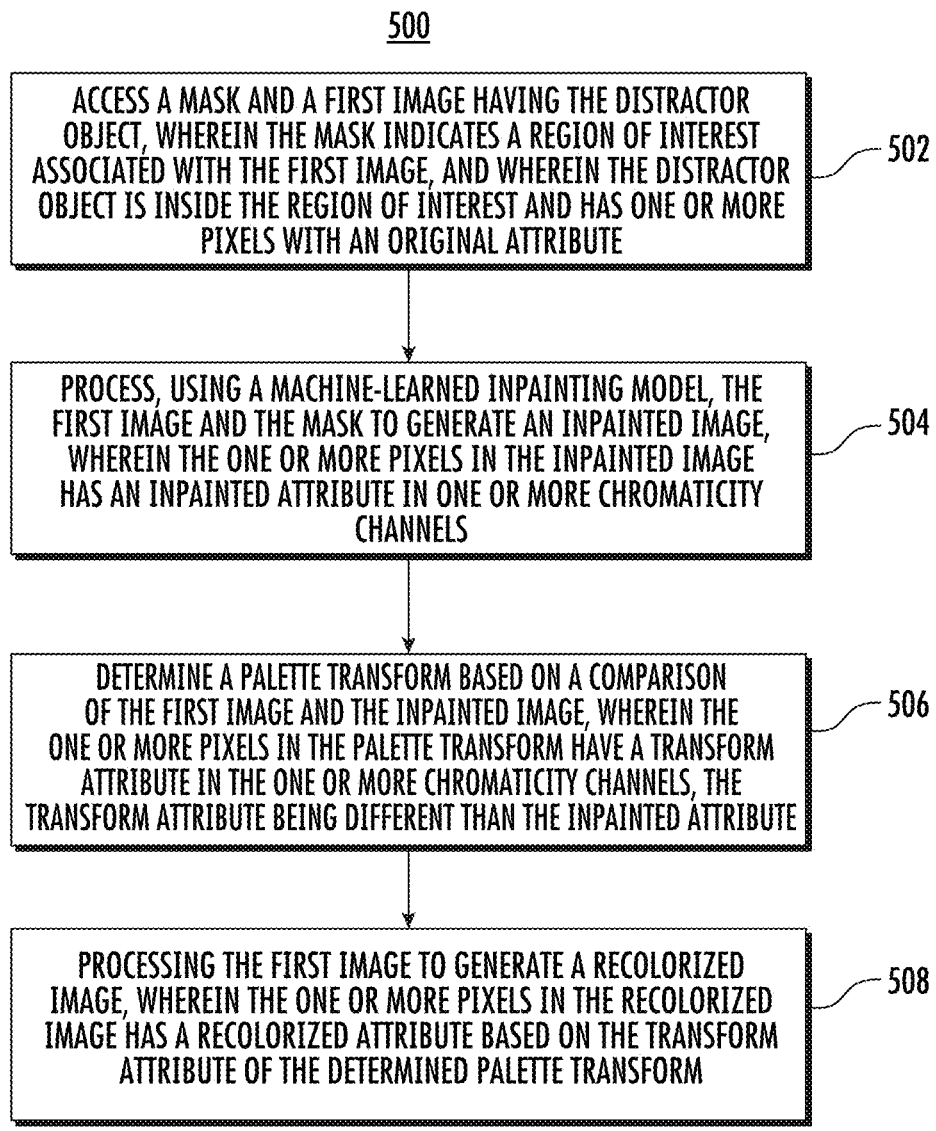
FIG. 5 depicts a flow chart of an example method for reducing a distraction from an image according to example embodiments of the present disclosure.

FIG. 5 depicts a flow chart diagram of an example for reducing a distractor object in a first image, according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

In some instances, the method 500 can include a computing system accessing a raw image prior to step 502. For example, the raw image can be in a red-green-blue (RGB) color space. Additionally, the computing system can process the raw image to generate the first image. For example, the first image can be in a hue-saturation-value (HSV) color space, a hue-saturation (HS) channels, or other similar chromaticity channels.

The computing system can be user computing device 102, server computing system 130, training computing system 150, computing device 10, computing device 50. The computing system can use one or more processors (e.g., processor(s) 112, 132, 152) to access the raw image, and access the mask and the first image at 502.

At 502, the computing system user can access a mask and the first image having the distractor object. The mask can indicate a region of interest in the first image that is associated with the boundaries of the distractor object. The distractor object can be inside the region of interest and can have one or more pixels with an original attribute.

For example, the mask accessed at 502 can be similar to the mask 203 in FIG. 2, and the first image accessed at 502 can be similar to the original image having a distractor 202 in FIG. 2. In another example, the mask accessed at 502 can be similar to the mask 354 in FIG. 3B, and the first image accessed at 502 can be similar to the HS image 352 in FIG. 3B. In yet another example, the dilated mask 428 in FIG. 4 can be determined based on the mask accessed at 502, and the original image in HS 410 in FIG. 4 can be to the first image accessed at 502.

In some instances, the mask can be received by the computing system from the user input component 122. For example, the region of interest can be inputted by a user on the user device computing device 102. The user can select (e.g., highlight) one or more distractors in the first image, and request the computing system to reduce these selected distractors by harmonizing them with the background of the first image.

In another example, the computing system can determine the mask by using a segmentation model to determine the boundaries of the distractor object. As previously mentioned, the mask may be inaccurate (e.g., not properly define the boundaries of the distractor object), but the recolorized image that is processed at 508 can still be realistic.

As previously mentioned, the first image accessed at 502 can be generated by processing a raw image. The raw image can be in the RGB color space, and the first image can be in the HSV color space. The first image can be generated, from the raw image, in the HS channels of the HSV color space by keeping the value (V) attribute of each pixel in the first image constant. Alternatively, the first image can be generated, from the raw image, in the AB channels of the LAB color space by keeping the luminance (L) attribute of each pixel in the first image constant.

In some instances, the original attribute associated with the one or more pixels of the distractor object in the first image can have an attribute in one or more chromaticity channels. For example, the one or more chromaticity channels can be a hue-saturation (HS) channels, and the original attribute of each pixel of the distractor object can include a hue attribute and a saturation attribute. Additionally, the value attribute of the original image, the inpainted image, and the recolorized image can be kept constant.

Additionally, method 500 can include the computing system processing the first image and the mask to generate a masked image prior to step 504. In some instances, after receiving the mask and the first image at 502, the computing system can process the first image and the mask to generate a masked image. For example, the computing system can use the masking technique 204 described in FIG. 2 to generate the masked image 206. As previously described, the masked image (e.g., masked image 206), which can be in the HS channels, can be a lower resolution image than the raw image, which can be in the RGB color space. Subsequently, the masked image can be inputted into the machine-learned inpainting model to generate the inpainted image.

At 504, the computing system can process, using a machine-learned inpainting model, the first image and the mask to generate an inpainted image. The one or more pixels of the distractor object can have an inpainted attribute in one or more chromaticity channels. As previously mentioned, the one or more chromaticity channels can be the hue-saturation (HS) channels, and the inpainted attribute can be in the HS channels. For example, the inpainted attribute can be a hue attribute and a saturation attribute. Additionally, the value attribute of the first image, the inpainted image, and recolorized image can be kept constant throughout the process described in method 500. For example, when the RGB image is transformed in the HSV color space, the value attribute can be kept constant. As previously described, by keeping the value attribute constant, the schematic perception of an object (e.g., distinctive features of an object that specifies the uniqueness of the object as perceived by a user) to be maintained during the processing described in method 500.

For example, the computing system, at step 504, can use the inpainting model 208 described in FIG. 2 to generate the inpainted image 212 based on the masked image 206. The machine-learned inpainting model 208 can be trained using chromaticity channel training data, such as HS training data 210. Additionally, the machine-learned inpainting model can be trained using hue-saturation-value (HSV) training data or other color space training data. Other color space training data can include, but is not limited to, RGB, hue-saturation-luminance (HSL), cyan-magenta-yellow-key (CMYK), and so on.

At 506, the computing system can determine a palette transform based on a comparison of the first image and the inpainted image. The one or more pixels of the distractor object can have a transform attribute in the one or more chromaticity channels. The transform attribute, which can also be in the HS channels, can be different from the inpainted attribute that is obtained at 504. The illustration 400 in FIG. 4 describes an example of determining a palette transform (e.g., palette transform 440) based on a comparison of the first image (e.g., original image in HS 410) and the inpainted image (e.g., inpainted image 430).

In some instances, the palette transform determined at 506 is a machine-learned model having a voting classifier. For example, the voting classifier can assign an HS attribute of a background pixel to a pixel associated with the distractor object in the original image as described in illustration 400. The machine-learned model can be based on majority voting, plurality voting, weighted voting, simple averaging, or weighted averaging. Similarly, the determination of the voting classifier can be based on majority voting, plurality voting, weighted voting, simple averaging, or weighted averaging. The example described in FIG. 4 is an example of a plurality voting method.

For example, the distractor object can include a plurality of pixels with the original attribute, and the transform attribute of the one or more pixels of the distractor object can be determined based on a plurality voting technique. Alternatively, the transform attribute can be determined based on majority voting, weighted voting, simple averaging, weighted averaging, and other voting techniques.

In some instances, the palette transform is further determined based on a dilated mask. The dilated mask can have an expanded region of interest associated with the first image. The expanded region of interest of the dilated mask being larger than the region of interest of the mask. For example, the region of interest associated with the mask accessed at 502 can be a subsection of the expanded region of interest associated with the dilated mask. As described in FIG. 2, the palette transform 216 can be determined by the voting technique 214 using the inpainted image 212 and the dilated mask. As previously mentioned, method 500 can reduce the distraction while maintaining the realness of the image even with an inaccurate mask. By using a dilated mask, it allows the computing system to reduce the error associated with an inaccurate mask.

At 508, the computing system can process the first image to generate a recolorized image. The one or more pixels of the distractor object in the recolorized image can have a recolorized attribute based on the transform attribute of the determined palette transform. The recolorized attribute can be different from the inpainted attribute. For example, the recolorized image can be similar to the recolorized image in HS 450 described in FIG. 4. In another example, the recolorized image can be the recolorized image 220 that is generated when the computing system applies the palette transform 218 to the original image 202.

In some instances, method 500 can further access a raw image. The raw image can be in a red-green-blue (RGB) color space. Additionally, the method 500 can further include the computing system processing the raw image to generate the first image. For example, the first image can be in a hue-saturation (HS) channels.

Additionally, the raw image can be a high-resolution image, and the first image that is generated by method 500 can be a low-resolution image. By having a low-resolution first image, masked image, and inpainted image, the processing time of method 500 can be faster. Additionally, the training of the machine-learning models can also be faster.

Moreover, the recolorized image can be in the HS channels, and the method 500 can further include processing the recolorized image generated at 508 to generate a final image. The final image can be in a red-green-blue (RGB) color space. Furthermore, the recolorized image can be a high-resolution image, and the final image is a high-resolution image. This is another example of a technical effect where method 500 can produce faster processing time without reducing image quality.

Figure 6:
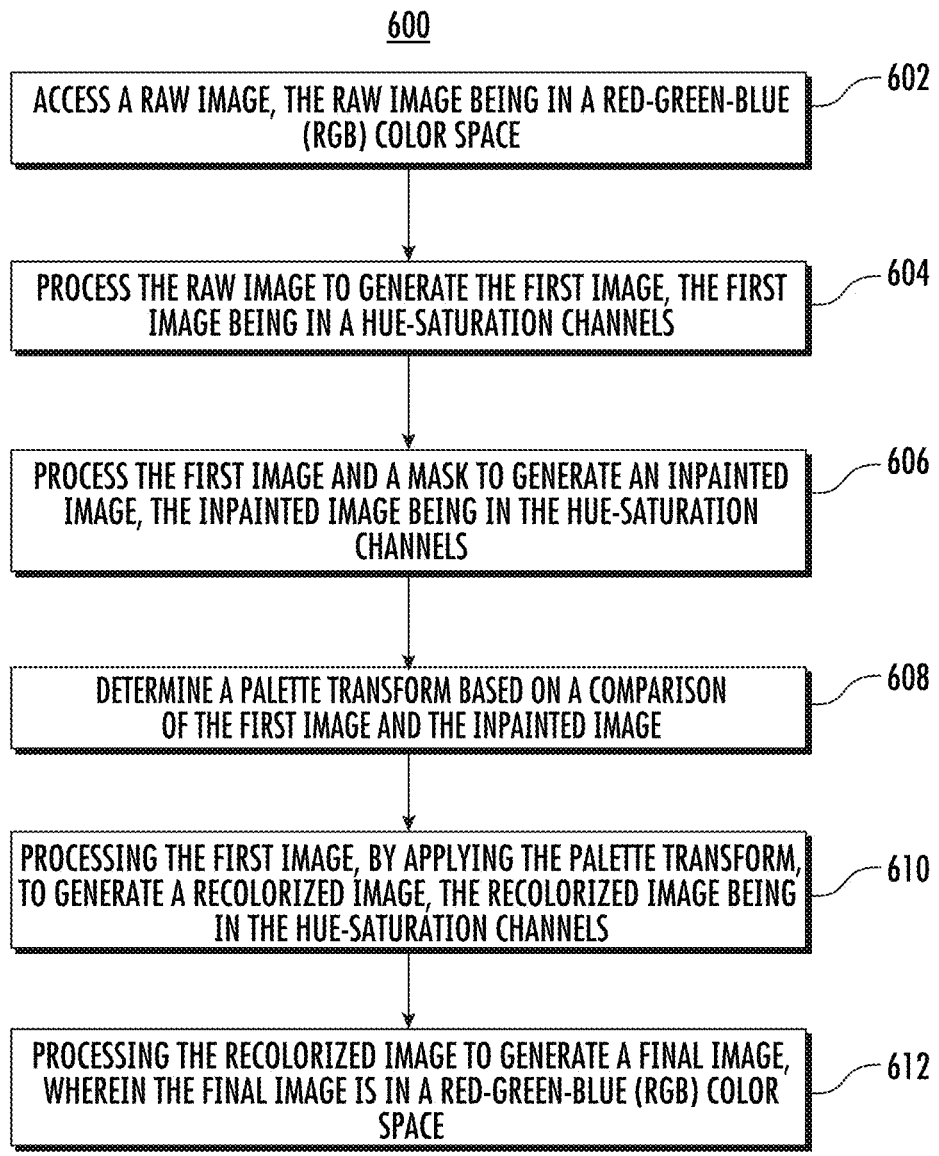
FIG. 6 depicts a flow chart of another example method for reducing a distraction from an image according to example embodiments of the present disclosure.

FIG. 6 depicts a flow chart diagram of another example for reducing a distractor object in a first image, according to example embodiments of the present disclosure. Although FIG. 6 depicts steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

At 602, the computing system can access a raw image. The raw image being in a RGB color space. The raw image can be a high-resolution image. The raw image can include a distractor object.

At 604, the computing system can process the raw image to generate the first image. The first image can be a low-resolution image. A low-resolution image has a lower dots-per-inch (DPI) number than a high-resolution image. In some instances, the DPI low-resolution image can be a fraction (e.g., ¼, ½) of the DPI of the high-resolution image. The first image can be in the HS channels. The distractor object can have one or more pixels having an original hue attribute and an original saturation attribute. The first image processed at 604 can be similar to the first image that is accessed at 502 of method 500.

At 606, the computing system can process the first image and a mask to generate an inpainted image. The inpainted image can be in the HS channels. The inpainted image can be a low-resolution image. The one or more pixels of the distractor object can have an inpainted hue attribute and an inpainted saturation attribute, where the inpainted hue attribute can be different than the original hue attribute and the inpainted saturation attribute can be different than the original saturation attribute. The inpainted image generated at 606 can be similar to the inpainted image that is generated at 504 of method 500.

At 608, the computing system can determine a palette transform based on a comparison of the first image and the inpainted image. The palette transform can modify the inpainted hue attribute and/or the inpainted saturation attribute. The palette transform can be determined based on the techniques described in FIG. 4. Additionally, the palette transform determined at 608 can be similar to the palette transform determined at 506 of method 500.

At 610, the computing system can process, by applying the palette transform determined at 608, the first image to generate a recolorized image. The recolorized image can be in the HS channels. The one or more pixels of the distractor object can have a recolorized hue attribute and recolorized saturation attribute, where the recolorized hue attribute can be different than the inpainted hue attribute and the recolorized saturation attribute can be different than the inpainted saturation attribute. The recolorized image can be a high-resolution image. The recolorized image generated at 610 can be similar to the recolorized image generated at 508 of method 500.

At 612, the computing system can process the recolorized image to generate a final image. The final image can be in the RGB color space. The final image can be a high-resolution image.

Figure 7:
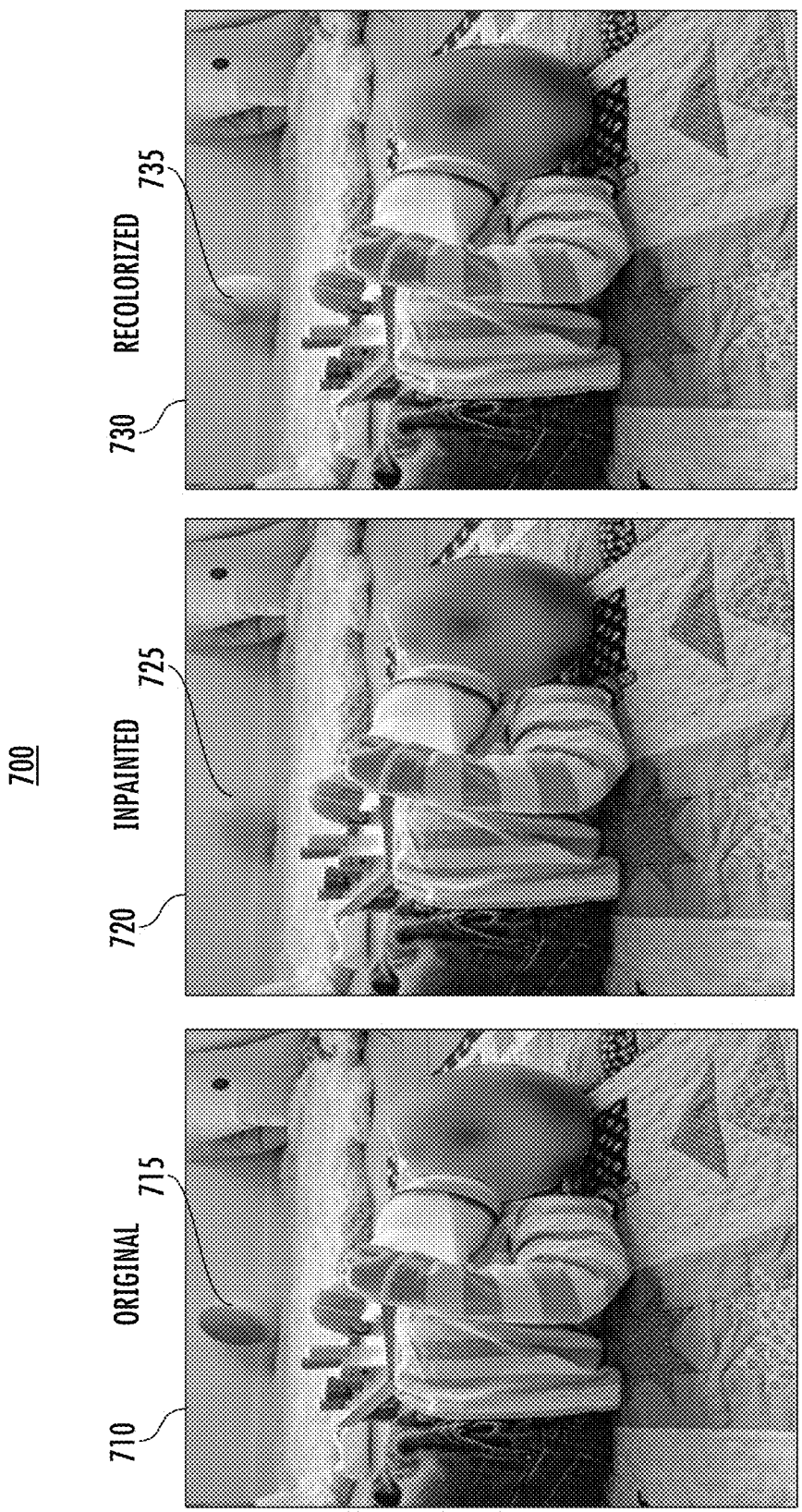
FIG. 7 depicts an illustration of transforming an original image into an inpainted image and a recolorized image according to example embodiments of the present disclosure.

FIG. 7 depicts an illustration 700 of transforming an original image into an inpainted image and a recolorized image according to example embodiments of the present disclosure. Conventional techniques may not be able to properly inpaint the distractor 715 from in the original image 710, as shown in the inpainted image 720. In the inpainted image 720, the distractor 715, which is a colorful ball, has become an inpainted object 725. As shown in the inpainted image 720, removing a distractor can result in the inpainted image 720 looking less realistic, as evident by shadows 725 still being present in the inpainted object 720. The inpainted image 720 illustrates an example of how removing a distractor object 715 from an original image 710 can be technically complicated. For example, by removing the distractor 715 from the original image 710, it can be difficult to determine what is happening behind the distractor, difficult to fill edges near the distractor, and removing shadows of the distractor. Instead of removing the distractor object 715, using techniques described herein, the original image 710 can be processed into a recolorized image 730 with the distractor object 735 being blended-in by adapting hues and saturations from the background of the original image 710.

FIG. 8 depicts another illustration 800 of transforming an original image into a recolorized image according to example embodiments of the present disclosure. In the example illustration 800, the original image 810 is transformed into the recolorized image 820. In the recolorized image 820, the first distractor object 830, the second distractor object 840, and the third distractor object 850 are modified to blend with the background of the original image 810. As a result, the recolorized image 820 maintains the realism of the original image 810 but has reduced the distraction associated with the distractor objects 830-850. As previously described in FIG. 3C, the recolorized image 820 in FIG. 8 can be generated based at least on the inpainted image 368 of FIG. 3C.

Figure 9:
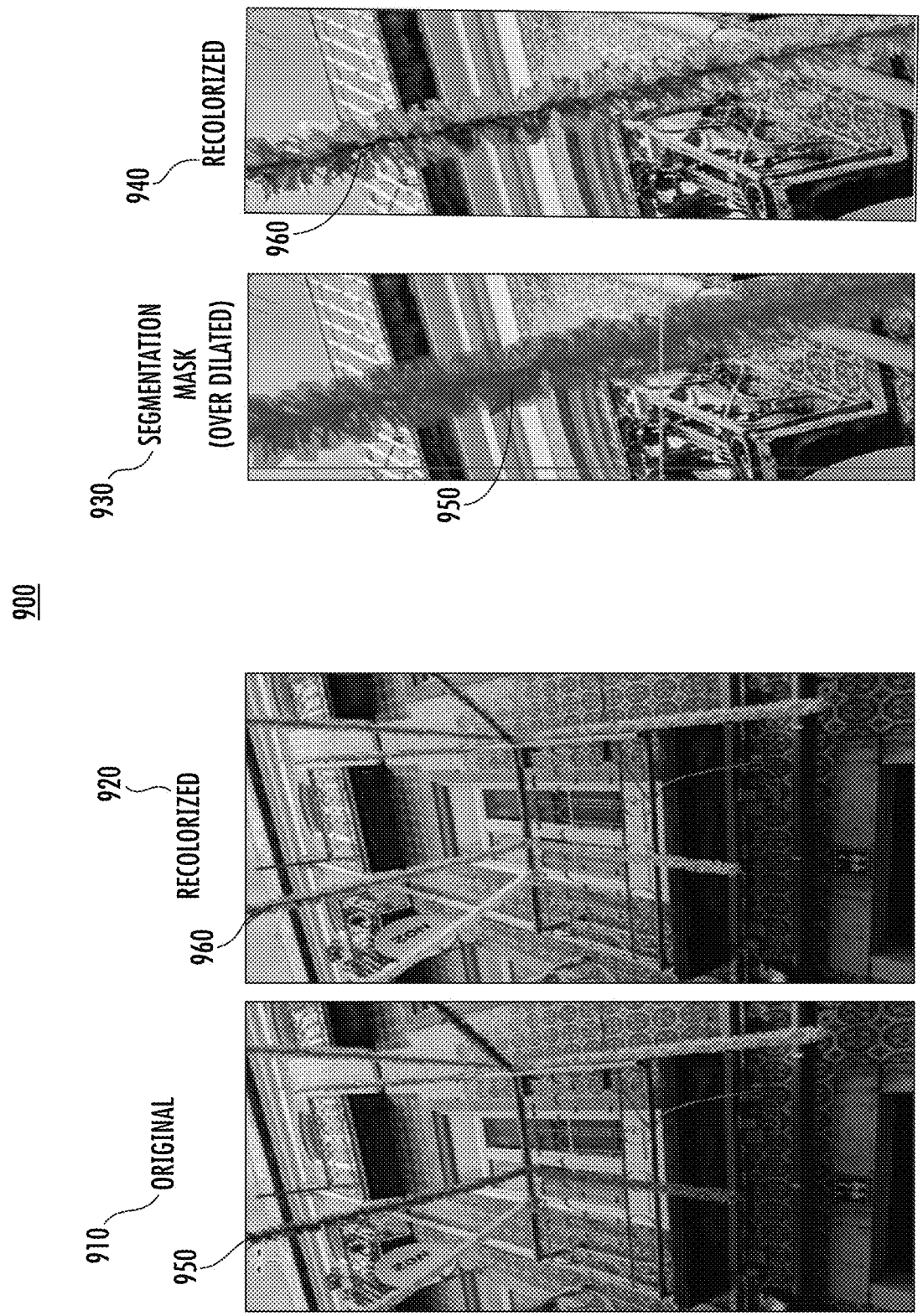
FIG. 9 depicts another illustration of transforming an original image into a recolorized image according to example embodiments of the present disclosure.

FIG. 9 depicts another illustration of transforming an original image into a recolorized image according to example embodiments of the present disclosure. In this example illustration 900, the distractor object 950 in the original image 910 can be modified to a recolorized object 960 in order to reduce the distraction in recolorized image 920. Additionally, as illustrated in the zoomed in version of the original image 930, the distractor object 950 can be properly modified as a recolorized object 960 regardless of the accuracy of the mask. As illustrated in this example, the mask, which can be inputted by a user or determined by a segmentation model, can be inaccurate. The mask can define the boundaries of the distractor object. In conventional systems, when the mask is inaccurate, the final image after the processing may not look realistic because the boundaries of the distractor object are inaccurate, and therefore the removal of the distractor object causes the final image to look unrealistic. In this example illustration, the recolorized object 960 blends in with the background, which results in the recolorized image 940 to look more realistic.

Additional Disclosure

The technology discussed herein refers to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for reducing a distractor object in a first image, the method comprising:
    accessing, by one or more computing devices, a mask and the first image having the distractor object, wherein the mask indicates a region of interest associated with the first image, and wherein the distractor object is inside the region of interest and has one or more pixels with an original attribute;
    processing, using a machine-learned inpainting model, the first image and the mask to generate an inpainted image, wherein the one or more pixels in the inpainted image has an inpainted attribute in one or more chromaticity channels;
    determining a palette transform based a comparison of the first image and the inpainted image, wherein the one or more pixels in the palette transform have a transform attribute in the one or more chromaticity channels, the transform attribute being different than the inpainted attribute; and
    processing the first image to generate a recolorized image, wherein the one or more pixels of the distractor object in the recolorized image has a recolorized attribute based on the transform attribute of the determined palette transform.

2. The computer-implemented method of claim 1, processing the first image to generate the inpainted image includes:
    processing the first image and the mask to generate a masked image; and
    wherein the masked image is inputted into the machine-learned inpainting model to generate the inpainted image.

3. The computer-implemented method of claim 1, wherein the one or more chromaticity channels comprise hue and saturation (HS) channels, and wherein a value attribute for each pixel in the original image, the inpainted image, and the recolorized image is kept constant.

4. The computer-implemented method of claim 1, wherein the recolorized attribute is different from the inpainted attribute.

5. The computer-implemented method of claim 1, wherein the palette transform is generated through performance of a voting technique.

6. The computer-implemented method of claim 1, wherein the distractor object includes a plurality of pixels with the original attribute, and wherein the one or more pixels of the distractor object is determined to have the transform attribute in the palette transform based on a plurality voting technique.

7. The computer-implemented method of claim 1, wherein the palette transform is further determined based on a dilated mask, the dilated mask having an expanded region of interest associated with the first image, the expanded region of interest of the dilated mask being larger than the region of interest of the mask.

8. The computer-implemented method of claim 1, wherein the machine-learned inpainting model is trained using hue and saturation (HS) training data.

9. The computer-implemented method of claim 1, further comprising:
accessing a raw image, the raw image being in a red-green-blue (RGB) color space; and
processing the raw image to generate the first image, wherein the first image is in a hue-saturation (HS) channels, and wherein a value attribute for each pixel in the first image is kept constant when the raw image is processed to generate the first image.

10. The computer-implemented method of claim 9, wherein the raw image is a high-resolution image, and a version of the first image that is processed by the machine-learned inpainting model is a low-resolution image.

11. The computer-implemented method of claim 9, wherein the recolorized image is in the hue-saturation (HS) channels, the method further comprising:
processing the recolorized image to generate a final image, wherein the final image is in a red-green-blue (RGB) color space.

12. The computer-implemented method of claim 11, wherein the recolorized image is a high-resolution image, and the inpainted image is low-resolution image.

13. A computing system, comprising:
one or more processors; and
one or more non-transitory computer-readable media that collectively store:
a machine-learned inpainting model, wherein the machine-learned inpainting model is configured to generate an inpainted image using a first image; and
instructions that, when executed by the one or more processors, cause the computing system to perform operations, the operations comprising:
accessing a mask and the first image having a distractor object, wherein the mask indicates a region of interest associated with the first image, and wherein the distractor object is inside the region of interest and has one or more pixels with an original attribute;
processing, using the machine-learned inpainting model, the first image and the mask to generate an inpainted image, wherein the one or more pixels of the inpainted image has an inpainted attribute in one or more chromaticity channels;

determining a palette transform based a comparison of the first image and the inpainted image, wherein the one or more pixels in the palette transform have a transform attribute in the one or more chromaticity channels, the transform attribute being different than the inpainted attribute; and
processing the first image to generate a recolorized image, wherein the one or more pixels in the recolorized image has a recolorized attribute based on the transform attribute of the determined palette transform.

14. The computer system of claim 13, the operations further comprising:
processing the first image and the mask to generate a masked image; and
wherein the masked image is inputted into the machine-learned inpainting model to generate the inpainted image.

15. The computer system of claim 13, wherein the one or more chromaticity channels comprise hue and saturation (HS) channels, and wherein a value attribute for each pixel in the original image, the inpainted image, and the recolorized image is kept constant.

16. The computer system of claim 13, wherein the recolorized attribute is different from the inpainted attribute.

17. The computer system of claim 13, wherein the distractor object includes a plurality of pixels with the original attribute, and wherein the one or more pixels of the distractor object is determined to have the transform attribute in the palette transform based on a plurality voting technique.

18. The computer system of claim 13, wherein the machine-learned inpainting model is trained using hue and saturation (HS) training data.

19. The computer system of claim 13, the operations further comprising:
accessing a raw image, the raw image being in a red-green-blue (RGB) color space; and
processing the raw image to generate the first image, wherein the first image is in a hue-saturation (HS) channels, and wherein a value attribute for each pixel in the first image is kept constant when the raw image is processed to generate the first image.

20. One or more non-transitory computer-readable media that collectively store a machine-learned inpainting model, wherein the machine-learned inpainting model has been learned by performance of operations, the operations comprising:
accessing a mask and a first image having a distractor object, wherein the mask indicates a region of interest associated with the first image, and wherein the distractor object is inside the region of interest and has one or more pixels with an original attribute;
processing, using the machine-learned inpainting model, the first image and the mask to generate an inpainted image, wherein the one or more pixels in the inpainted image has an inpainted attribute in one or more chromaticity channels;
determining a palette transform based a comparison of the first image and the inpainted image, wherein the one or more pixels in the palette transform have a transform attribute in the one or more chromaticity channels, the transform attribute being different than the inpainted attribute; and
processing the first image to generate a recolorized image, wherein the one or more pixels in the recolorized image has a recolorized attribute based on the transform attribute of the determined palette transform.

\* \* \* \* \*